G. PROVOT.
MOTOR VEHICLE.
APPLICATION FILED FEB. 23, 1909.
950,728.
Patented Mar. 1, 1910.
2 SHEETS—SHEET 1.
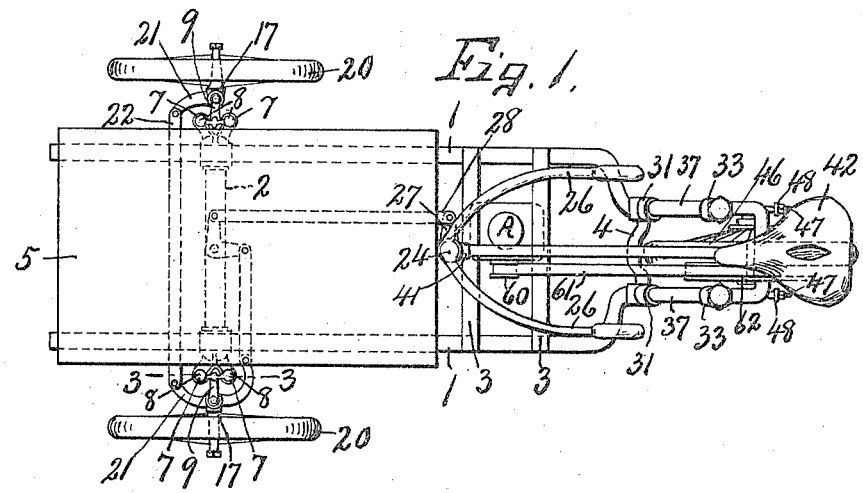
Witnesses
Inventor
George Provot
By Howard P. Davidson
Attorney

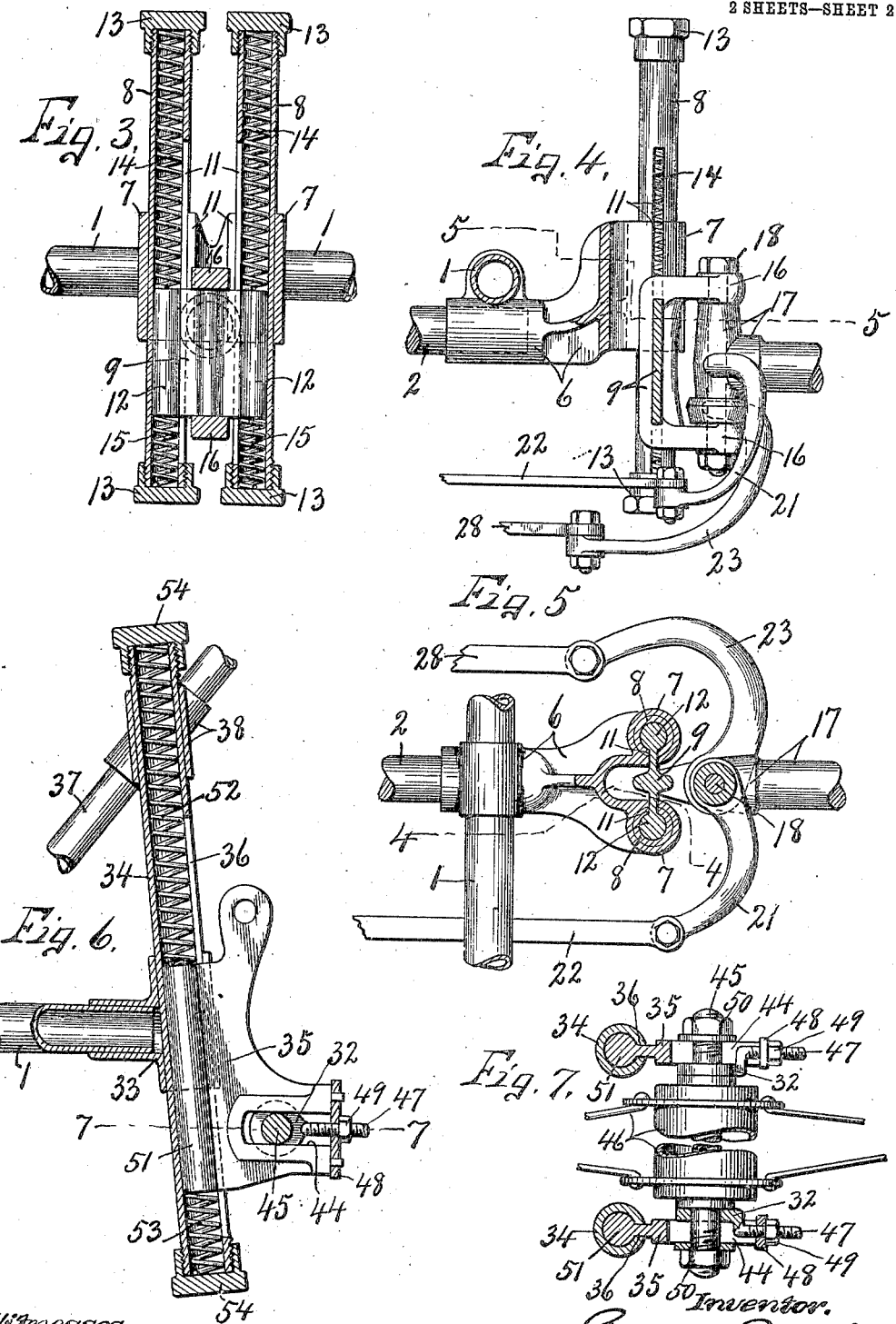

UNITED STATES PATENT OFFICE.

GEORGE PROVOT, OF NEW YORK, N. Y.

MOTOR-VEHICLE.

950,728.　　　　Specification of Letters Patent.　　Patented Mar. 1, 1910.

Application filed February 23, 1909. Serial No. 479,565.

*To all whom it may concern:*

Be it known that I, GEORGE PROVOT, of New York city, in the county of New York, in the State of New York, have invented new and useful Improvements in Motor-Vehicles, of which the following, taken in connection with the accompanying drawings, is a full, clear, and exact description.

This invention relates to certain improvements in motor vehicles, and refers more particularly to three wheeled vehicles, commonly known as tri-cars, in which a single driving or traction wheel is located at the rear and centrally of the line of travel of the two front steering wheels. Heretofore one of the main difficulties in the use of machines of this character has been that when either of the front wheels encounter an obstruction or inequality in the road bed causing a sudden tilting of the front axles, a similar tilting movement is transmitted to the whole frame and also to the rear wheel and causes the latter to skid or slide sidewise upon the pavement, which of course subjects the frame to excessive torsional strains and renders the machine more or less uncontrollable and dangerous. Another objection to these machines is that no provision appears to have been made to relieve the machine from excessive shock or vibration due to the sudden recoil of the main supporting springs after encountering such obstruction or inequalities.

My main object therefore is to overcome these objectionable features by mounting each wheel in a separate yielding bearing, guided on the main frame in such manner that it will maintain a position substantially perpendicular thereto, and at the same time will yield independently of the others and of the frame and will therefore allow the machine to pass over such obstructions without transmitting any appreciable tilting movement to such frame or skidding action of the rear wheel and will also reduce to a minimum the shock and vibration incidental to the recoil of the main springs.

Other objects and uses will be brought out in the following description.

In the drawings—Figures 1 and 2 are, respectively, a top plan and side elevation of a tri-car embodying the various features of my invention. Fig. 3 is an enlarged sectional view taken on line 3—3, Fig. 1, showing the yielding bearing for one of the front wheels and adjacent tubular guides in which the coil springs are located. Figs. 4 and 5 are detail sectional views taken on lines 4—4 Fig. 5 and 5—5 Fig. 4, showing also the connections between one of the front wheel steering knuckles and supporting frame. Fig. 6 is an enlarged vertical sectional view through one of the upright spring containing tubes in which one rear wheel supporting bracket is guided. Fig. 7 is a sectional view taken on line 7—7 Fig. 6.

In carrying out the object stated I have provided a pair of substantially horizontal side bars —1—, which are rigidly connected together by a front cross bar —2—, intermediate cross bars —3— and rear cross bar —4—.

The side bars —1— are identical in construction and preferably consist of metal tubes, the greater portion of which are spaced some distance apart and parallel and held in such relation by the cross bars —2 and 3— for receiving and supporting a suitable receptacle —5—, the rear ends of said bars being brought in close relation and held in such relation by the cross bar —4—.

The front cross bar is rigidly united to the side bar —1— by metal couplings —6— into which the bars —1 and 2— are brazed or otherwise firmly secured, the cross bar —2— being disposed in a plane below that of the bars —1— and having its opposite ends brazed or otherwise secured in the couplings —6— as best seen in Fig. 4.

Each of the couplings —6— is provided with a bifurcated lateral extension terminating in a pair of upright tubular heads —7—, in which are brazed or otherwise rigidly secured upright tubular casings —8—, which extend some distance above and below the tubular heads —7—. The tubular heads —7— and therefore the corresponding casing —8— are located at the outside of the bars —1— and those of each pair are disposed an equal distance from and at the front and rear of the axis of the cross bar —2— leaving intervening space for receiving a vertical moving knuckle section —9—.

Each knuckle section —9— extends forwardly and rearwardly through transverse slots —11— in the adjacent faces of the tubular casings —8— and are provided with cylindrical heads —12— which are seated with an easy sliding fit into the tubular casings—8—, the slots —11— being of sufficient vertical length to permit a limited sliding movement of the knuckle sections —9— relatively to the tubular casing —8—. The opposite ends of the tubular casings —8— are closed by screw caps —13— which form seats for upper and lower sets of coil springs —14 and 15—. The springs —14— are interposed between the upper ends of the sliding heads —12— and inner ends of the caps —13— and are sufficiently heavy to yieldingly sustain the load carried by the vehicle. The springs —15— which may be termed the shock absorbers are interposed between the lower ends of the sliding heads —12— and lower caps —13— and are somewhat lighter and shorter than the upper springs —14— to take up the recoil from the main springs after the vehicle has passed over an obstruction, thereby avoiding excessive shock to the frame and relieving the strain incidental thereto.

Each of the knuckle sections —9— is provided with a pair of laterally projecting horizontal arms —16—, spaced some distance apart one above the other for receiving between them a horizontally swinging knuckle section —17— which is pivotally held in place by a bolt —18— passing through the arms —16— and hub of the section —17—, the latter being provided with a horizontally projecting axle stub for receiving one of the front steering wheels —20—. These knuckles —17— may be connected for simultaneous action by any suitable mechanism, and for this purpose are provided with integral crank arms —21— which are connected to each other by a link —22—. One of the knuckle sections —17— is provided with an additional integral crank arm —23—, which may be connected by any suitable mechanism to a steering post —24—. This steering post —24— is rotatably mounted in an upright tubular bearing —25— and provided at its upper end with steering handles —26—, while its lower end is provided with a crank arm —27— connected by links —28— to the crank arm —23—, the tubular post —25— being rigidly connected to the main supporting frame in the manner hereinafter described.

Secured to the rear ends of the side bars —1— by suitable couplings —33— are upright tubular casings —34— extending some distance above and below the couplings —33— for receiving vertically movable brackets —35—, which extend through upright slots —36— in the rear sides of the tubular casings —34—.

Rigidly secured to the side bars —1— by couplings —31— are upwardly and rearwardly inclined seat supporting bars —37— which are rigidly united to the upper ends of the casings —34— by couplings —38— and are preferably united at their upper ends some distance above the tubular casings —34— where they are connected by a horizontal bar —39—, and couplings —40 and 41— to the upright tubes —25— for the steering posts —24—. A seat —42— is secured by suitable fastening means —43— at the junction of the bar —39— with the upward and rearward inclined frame bar —37—, as best seen in Fig. 2.

The brackets —35— are provided with open sided slots or bearings —44— for receiving the opposite ends of an axle —45— of the rear wheel —46— which is located between the upright tubular casings —34— and also between the brackets —35—.

Suitable washers —32— encircle the opposite ends of the shaft —45— and engage the inner faces of the adjacent portions of the brackets —35—, said washers being provided with threaded stems or bolts —47— extending through suitable caps —48—, which close the open ends of the slots —44—, said bolts being engaged by nuts —49— for adjusting the shaft —45— lengthwise of the slot —44—. The ends of the shaft —45— project through the slots —44—, and are engaged by suitable nuts —50— for retaining the shaft in its adjusted position.

The brackets —35— are provided at their inner ends with circular heads —51—, which ride with an easy sliding fit in their respective tubular casings —34— and are interposed between coil springs —52 and 53—. The opposite ends of the tubular casings —34— are closed by suitable screw caps —54— which form abutments for the upper ends of the coil springs —52— and for the lower ends of the springs —53— respectively, the adjacent ends of said springs engaging the opposite ends of the circular heads —51— of the brackets —35—.

The upper coil springs are somewhat heavier than the lower springs to yieldingly sustain the load of the vehicle, while the lower springs serve as buffers to take the rebound or recoil and thereby reduce the shock to the frame by the recoil of the upper springs when the vehicle is passing over obstructions.

It is clear from the foregoing description that the rear wheel is supported between and by vertical movable bearings, which are guided in the upright tubular casings —34— against the action of the springs —52 and 53—, the upper springs serving to yieldingly sustain the load and permit the wheel to move vertically relatively to the frame while the lower springs act as shock absorbers to prevent excessive jar or vibration of the frame in passing over an uneven surface or obstruction, due to the recoil of the load supporting springs and at the same time the tubular casings —34— in which the brackets —35— are movable serve to guide the wheel perpendicular to the frame in all positions.

The tubular guides —7— for the steering wheel at the front of the machine are arranged in pairs, those of each pair being arranged at the outer side of the frame but in close proximity thereto and constitute a part of the frame for receiving and guiding the vertical movable knuckle section —9— which supports the axle stub and therefore support the front wheels —20— so that the latter are movable vertically against the action of the springs —14 and 15— independently of each other and of the main supporting frame, which enables either wheel to yield vertically or perpendicularly to the frame in passing over obstructions or uneven surfaces in the road bed without tilting or unduly straining the frame of the machine, thus preventing any accidental tilting or skidding of the rear traction wheel.

With the exception of the intermediate cross bars —3— practically the entire frame is made of metal tubing said cross bars being preferably made of channel iron or steel, secured at their ends by brazing or otherwise to the side bars —1—, a sufficient distance in front of the axle bar —2— to permit the installation of the receptacle —5— wholly in front of the intermediate bars. These intermediate bars serve as convenient means for supporting a combustion engine —A— between them, said engine having its crank shaft provided with a sprocket wheel —60— which is connected by chain —61— to a somewhat larger sprocket wheel —62— on the axle of the rear traction wheel —46—, the sprocket wheel —62— being also located between the rear ends of the side bars —1— and in close proximity to the wheel —46—.

Any suitable mechanism not necessary to herein illustrate or describe may be employed for controlling the action of the engine and its connection with the traction wheel.

Although I have shown and described the spring cushion connections between the wheels and frame of a tri-car, it is clearly evident that they are equally applicable for use in connection with other wheel vehicles,—in fact I contemplate using this spring cushion device in connection with the rear wheel of a motor bicycle, and, therefore, the invention, so far as it pertains to the spring cushions, applies to wheel vehicles in general.

What I claim is:—

1. In a tri-car, a frame, a pair of upright tubes rigidly secured to the rear end of the frame and spaced some distance apart and provided with upright slots in their rear sides, a pair of coil springs seated in the lower and upper ends respectively of each tube, separate vertically movable brackets guided in said tubes and slots and interposed between the adjacent ends of the corresponding springs, an axle rigidly secured to the brackets, and a wheel journaled on the axle between the upright tubes.

2. In a tri-car, a horizontal frame, upright tubes rigidly secured intermediate their ends to said frame and spaced some distance apart, braces rigidly connecting the upper ends of the tubes to the frame, said tubes being provided with lengthwise slots in their rear sides, coil springs seated in opposite ends of the tubes, vertically movable brackets guided in said tubes and slots and having portions thereof interposed between the adjacent ends of corresponding sets of coil springs, an axle connecting said brackets, and a traction wheel journaled on said axle between the upright tubes.

3. In a three wheeled car, a supporting frame, separate pairs of upright tubes rigidly secured to opposite sides of the frame, those of each pair having lengthwise slots in their adjacent sides, co-axial coil springs seated in opposite ends of the tubes, vertically movable brackets, each guided in one of said pairs of tubes and slots therein and having portions thereof interposed between the adjacent ends of the corresponding sets of coil springs, axle sections journaled upon said brackets, and wheels journaled upon the axle sections.

4. In a three wheel vehicle of the class described, a main supporting frame comprising opposite side bars and cross bars secured thereto, the rear ends being spaced a less distance apart than the front ends, a pair of straight upright tubes each secured to the rear end of one of the side bars and provided with slots in their rear sides, separately movable brackets guided in said tubes and slots, coil springs seated in opposite ends of the tubes and bearing against the lower and upper sides of said brackets, an axle connecting said brackets and rigidly secured thereto, a traction wheel journaled on said axle between the upright tubes, separate pairs of straight upright tubes rigidly connected to the side bars of the frame, those of each pair being arranged one in advance of the other some distance apart and provided with lengthwise slots in their adjacent sides, heads, each movable vertically between and guided in said tubes and slots, coil springs seated in opposite ends of the tubes and bearing against the lower and upper faces of said heads, horizontally swinging axle sections journaled on said heads, steering wheels journaled on said axle sections, and steering mechanism connected to said axle sections for rocking the same.

In witness whereof I have hereunto set my hand this nineteenth day of February 1909.

GEORGE PROVOT.

Witnesses:
M. KUEHNE,
T. C. MEEKS.